United States Patent
Perelli et al.

(10) Patent No.: US 10,437,286 B2
(45) Date of Patent: Oct. 8, 2019

(54) COMPUTING DEVICE

(71) Applicant: Lenovo (Singapore) Pte. Ltd., Singapore (SG)

(72) Inventors: Thomas Perelli, Raleigh, NC (US); Ali Kathryn Ent, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/632,326

(22) Filed: Jun. 24, 2017

(65) Prior Publication Data
US 2018/0373294 A1    Dec. 27, 2018

(51) Int. Cl.
*G06F 1/16*    (2006.01)
*G06F 1/20*    (2006.01)

(52) U.S. Cl.
CPC .......... *G06F 1/1632* (2013.01); *G06F 1/166* (2013.01); *G06F 1/1618* (2013.01); *G06F 1/1656* (2013.01); *G06F 1/1658* (2013.01); *G06F 1/1688* (2013.01); *G06F 1/203* (2013.01)

(58) Field of Classification Search
CPC ......... G06F 1/1632; G06F 1/166; G06F 1/203
USPC ................. 361/679.4–679.45; 710/303, 304
See application file for complete search history.

(56) References Cited

U.S. PATENT DOCUMENTS

| | | | | |
|---|---|---|---|---|
| 4,978,949 A * | 12/1990 | Herron | .................. | G06F 1/1616 345/168 |
| 5,132,876 A * | 7/1992 | Ma | ........................ | G06F 1/1616 361/679.09 |
| 5,400,055 A * | 3/1995 | Ma | ........................ | G06F 1/1632 345/168 |
| 6,094,347 A * | 7/2000 | Bhatia | ..................... | G06F 1/203 165/104.33 |
| 6,246,575 B1 * | 6/2001 | Barrus | .................. | G06F 1/1616 361/679.55 |
| 6,266,243 B1 * | 7/2001 | Tomioka | ............... | G06F 1/1632 165/104.33 |
| 6,359,994 B1 * | 3/2002 | Markow | ............... | G06F 1/1616 361/679.41 |
| 6,542,360 B2 * | 4/2003 | Koizumi | ............... | G06F 1/1632 165/80.3 |
| 6,560,100 B1 * | 5/2003 | Shin | ....................... | G06F 1/1616 361/679.41 |
| 7,982,742 B2 * | 7/2011 | Casparian | ................. | G06F 3/14 345/1.1 |
| 8,030,889 B2 * | 10/2011 | Tamura | ................... | G06F 1/263 320/107 |
| 9,812,804 B2 * | 11/2017 | Hsu | ..................... | H01R 13/2421 |
| 2002/0157001 A1 * | 10/2002 | Huang | .................. | G06F 1/1632 713/2 |
| 2003/0110333 A1 * | 6/2003 | Fuchida | ............... | G06F 1/1632 710/72 |

(Continued)

*Primary Examiner* — Nidhi Thaker
(74) *Attorney, Agent, or Firm* — Brian J. Pangrle

(57) ABSTRACT

A device can include a processor; memory accessible by the processor; a display housing that includes a display operatively coupled to the processor; a keyboard housing that includes a keyboard on a keyboard side, a first interface on an opposing exterior side that couples to an expansion module and a second interface on an exterior hinge assembly side that couples to a docking station; and a hinge assembly that operatively couples the display housing to the keyboard housing.

17 Claims, 10 Drawing Sheets

(56) References Cited

U.S. PATENT DOCUMENTS

| | | | | |
|---|---|---|---|---|
| 2003/0221036 A1* | 11/2003 | Konetski | ............... | G06F 1/1632 |
| | | | | 710/303 |
| 2006/0061964 A1* | 3/2006 | Cheng | ................... | G06F 1/1632 |
| | | | | 361/679.41 |
| 2009/0037633 A1* | 2/2009 | Solomon | ............... | G06F 1/1632 |
| | | | | 710/303 |
| 2010/0131691 A1* | 5/2010 | Chatterjee | ............. | G06F 1/1632 |
| | | | | 710/303 |
| 2012/0106069 A1* | 5/2012 | Strauser | ............... | G06F 1/1632 |
| | | | | 361/679.41 |
| 2012/0252230 A1* | 10/2012 | Alameh | .............. | H04M 1/0256 |
| | | | | 439/31 |
| 2013/0277529 A1* | 10/2013 | Bolliger | ................ | F16M 11/10 |
| | | | | 248/676 |
| 2014/0321049 A1* | 10/2014 | Ashcraft | ............... | G06F 1/1632 |
| | | | | 361/679.43 |
| 2016/0282905 A1* | 9/2016 | Laine | .................... | G06F 1/1632 |

\* cited by examiner

COMPUTING DEVICE

TECHNICAL FIELD

Subject matter disclosed herein generally relates to technology for computing or other devices.

BACKGROUND

Various types of devices, display devices, computing and display devices, etc. exist that have a power connector for input of power via a power cord, an HDMI connector for output of video and audio via an HDMI cable, and a USB connector for receipt of a USB cable.

SUMMARY

A device can include a processor; memory accessible by the processor; a display housing that includes a display operatively coupled to the processor; a keyboard housing that includes a keyboard on a keyboard side, a first interface on an opposing exterior side that couples to an expansion module and a second interface on an exterior hinge assembly side that couples to a docking station; and a hinge assembly that operatively couples the display housing to the keyboard housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
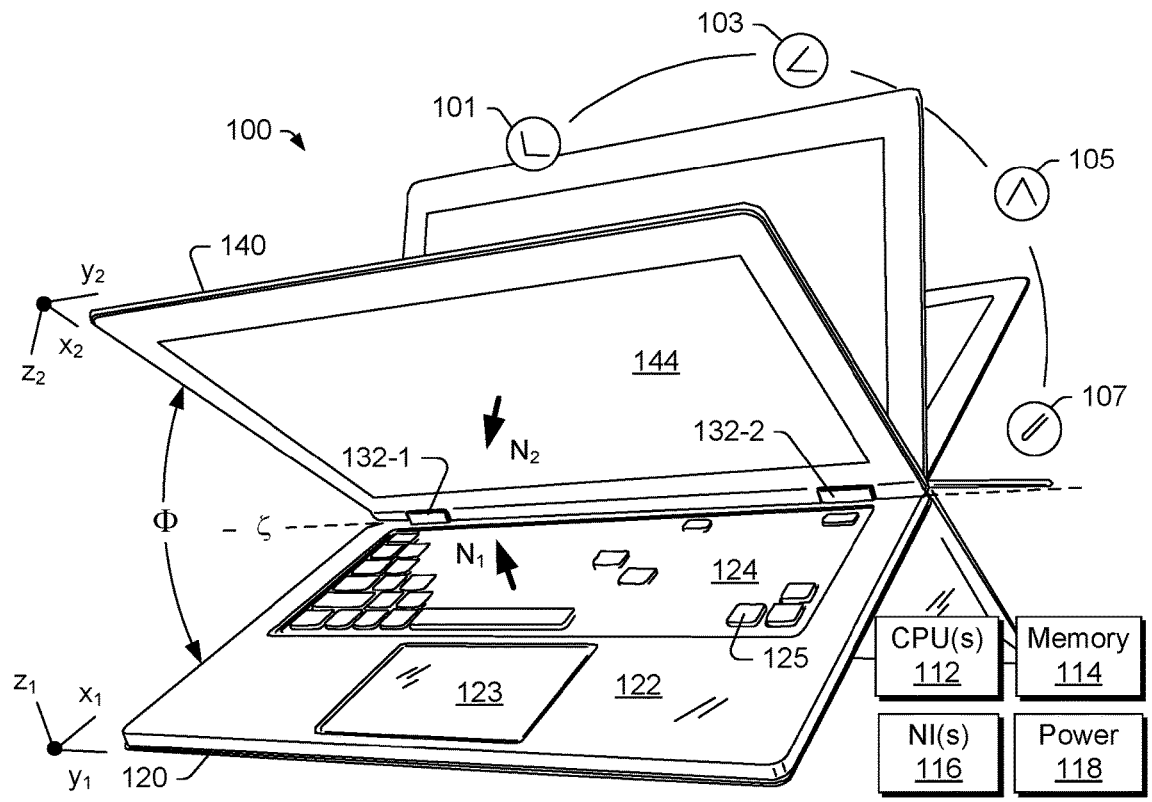
FIG. 1 is a diagram of an example of a device.
Figure 1:
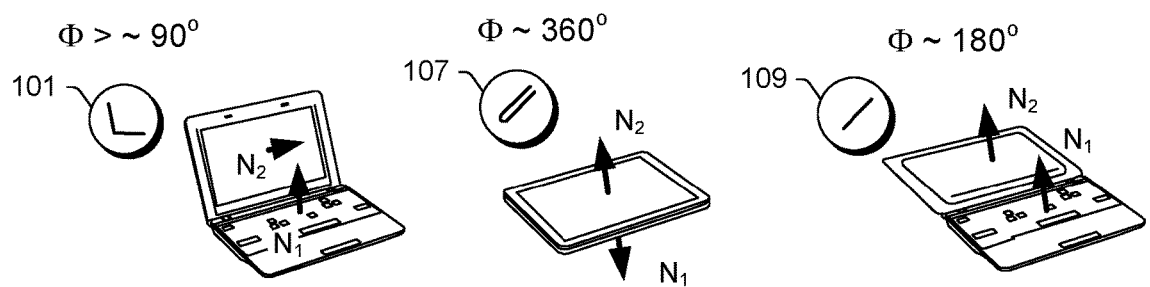

FIG. 1 shows an example of a device 100 that includes a keyboard housing 120 and a display housing 140 that are pivotable with respect to each other via movement about one or more hinges 132-1 and 132-2 (e.g., hinge assemblies).

The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140, or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
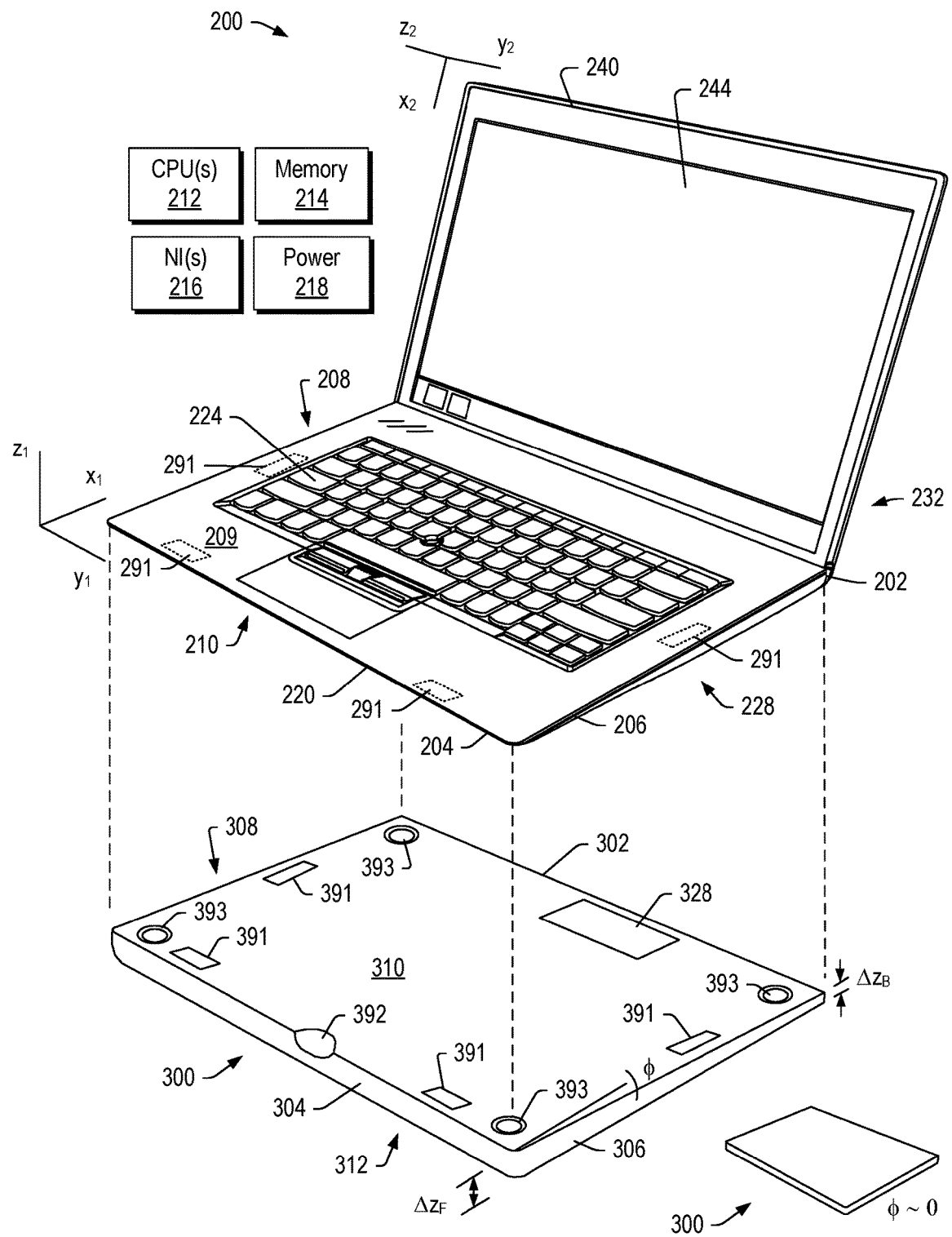
FIG. 2 is a diagram of an example of a device and an example of a module.

FIG. 2 shows an example of a device 200 that includes various features of the device 100 of FIG. 1. FIG. 2 also shows an example of a module 300 that can be operatively coupled to the device 200. As an example, the module 300 can be an expansion module in that it can "expand" the capabilities of the device 200. For example, the module 300 may expand one or more of power, processing, memory, communication, operating system, application, connection, etc., capabilities of the device 200.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

In FIG. 2, the module 300 is shown as including a back end 302, a front end 304, a right side 306, a left side 308, a top side 310 and a bottom side 312. The front end 304 may align with a front end of the keyboard housing 220 (see, e.g., the front side 204 in FIG. 2) and, for example, the right and left sides 306 and 308 may align with right and left sides 206 and 208 of the keyboard housing 220. As an example, the module 300 and the keyboard housing 220 can have a common footprint (e.g., a common size).

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

The device 200 can be operatively coupled to the module 300 at least in part via a device interface 228 (not shown) of the device 200 and a module interface 328 of the module 300. As an example, the device 200 and the module 300 can be operatively coupled via one or more attachment mechanisms. For example, one or more clips, one or more latches, one or more slots, one or more ferromagnetic materials, etc., may be utilized to physically attach the device 200 to the module 300. In an attached state, the device 200 and the module 300 may be carried about, for example, like a laptop (e.g., a laptop form factor computing device).

In the example of FIG. 2, the device 200 is shown as including one or more coupling features 291 and the module 300 is shown as including one or more coupling features 391. In such an example, the one or more coupling features 291 and/or the one or more coupling features 391 can include one or more magnets. In such an example, one or more of the coupling features 291 and 391 can include magnetic material (e.g., ferromagnetic material such as material that includes iron). In such an example, the module 300 can be physically coupled to the device 200 such that the keyboard housing 220 of the device 200 stacks on top of the module 300. Where one or more magnets are utilized, the one or more magnets can exert an attractive force that is sufficient to overcome the mass of the module 300 as influenced by gravity where the mass of the module 300 may be, for example, in a range from approximately 200 grams to approximately 5 kilograms. In such an example, if a user were to lift the device 200 by the sides 206 and 208 when the device 200 is coupled to the module 300, the module 300 would remain attached. And, if a user wanted to decouple the module 300 from the device 200, a user could apply force at one or more finger notches 392 to separate the device 200 from the module 300. In the example of FIG. 2, the module 300 is shown to include the finger notch 392, which may be optional; noting that one or more finger notches may be located elsewhere, additionally or alternatively. For example, one or both of the sides 306 and 308 of the module 300 may include one or more finger notches. A finger notch may have an opening area of about 0.5 cm$^2$ or more (e.g., up to several cm$^2$) sufficient to accommodate a fingertip such as a fingertip of an index finger; noting that the average width of the index finger is approximately 1.6 cm to approximately 2 cm for most adults. As an example, a keyboard housing such as the keyboard housing 220 of the device 200 may include one or more finger notches.

As an example, a module can include magnets and a device can include a keyboard housing that includes magnetic material such that the module and the device can be coupled via magnetic attraction force; noting that, as mentioned, a module and a device can include other arrangements of coupling features.

Figure 9:
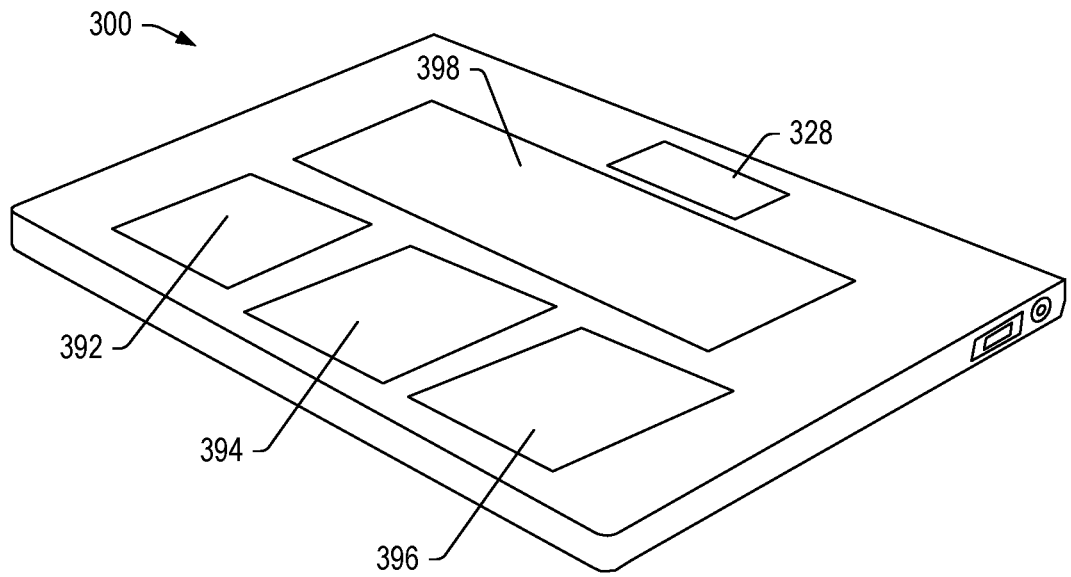
FIG. 9 is a diagram of the module and a block diagram of examples of circuitry.
Figure 9:
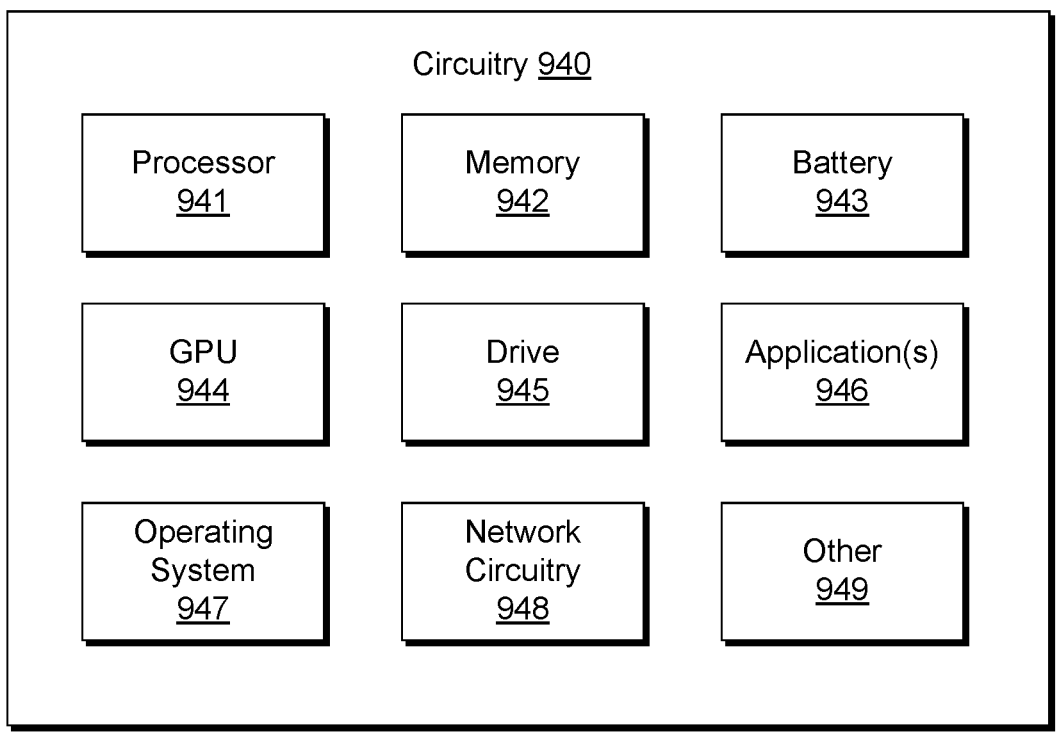

The module 300 can include one or more types of circuitry that can be operatively coupled to circuitry of the device 200. FIG. 9 shows some examples of circuitry 940 of the module 300, which may include a processor 941, memory 942, a battery 943, a graphics processing unit (GPU) 944, a drive 945, one or more applications 946, an operating system 947, network circuitry 948 and/or one or more other types of circuitry 949 (e.g., a fan, active sound enhancement, etc.).

As an example, the module 300 can include one or more passive features. For example, an airflow duct may be a passive feature of the module 300. Such a duct may be suitable for use for cooling and/or suitable for use for sound (e.g., passage of sound, resonance of sound, etc.). As an example, the module 300 may include one or more sound enhancement features, which may include one or more passive and/or one or more active features. As an example, where a module includes bays, one or more sound enhancement plug-ins may be available and suitable for plugging into one or more of the bays. When such a module is stacked with a device, the one or more sound enhancement plug-ins may enhance sound generated by the device.

Figure 6:
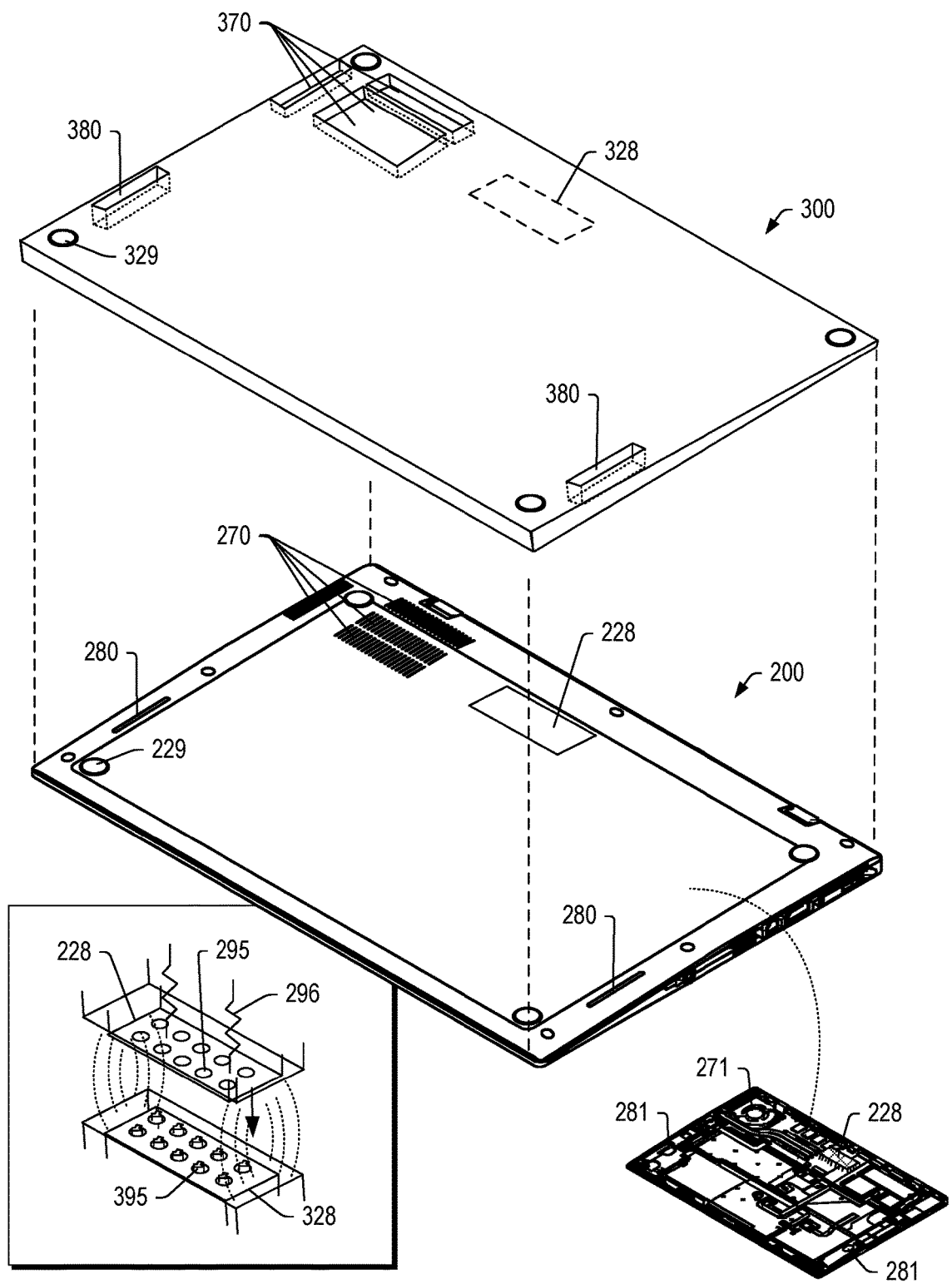
FIG. 6 is a diagram of the device and the module.

In the example of FIG. 2, the module 300 is shown as optionally including one or more recesses 393 that can accommodate one or more features of the device 200. For example, where the keyboard housing 220 includes feet, the top side 310 can include recesses that can accommodate the feet. In such an arrangement, where the feet of the keyboard housing 220 are made of a resilient material (e.g., an elastomeric material such as one or more of natural rubber, synthetic rubber, etc.), the feet may be received by the recesses and be in contact with the top side 310 of the module 300 to provide elasticity that may help to damp vibration. In such an example, the feet as received in the recesses 393 may space apart one or more surfaces of the module 300 and the keyboard housing 220, for example, to avoid direct contact therebetween, which may help to avoid wear (e.g., scuffing, etc.), help to avoid conduction of heat, etc. In such an example, one or more spaces may be created between the module 300 and the keyboard housing 220, which may allow for air flow. As an example, one or more spaces can be created at least in part via feet of a keyboard housing in contact with a top surface of a module, which may include one or more feet recesses or may not include one or more feet recesses. As an example, a module can include a top surface with two feet recesses for two feet of a keyboard housing where the keyboard housing may include more than two feet or merely two feet. FIG. 6 shows an example of the keyboard housing 220 as including feet 229 and an example of the module 300 as including feet 329.

FIG. 2 shows various coordinate systems and some examples of dimensions such as, $\Delta z_F$ and $\Delta z_B$ of the module 300. As shown, the keyboard housing 220 of the device 200 can be sloped (e.g., wedge shaped) and the module 300 can be sloped (e.g., wedge shaped). Alternatively, one or more of the keyboard housing 220 and the module 300 can be substantially cuboid in shape where, for example, corners of such a shape may be substantially right (e.g., approximately 90 degrees).

The device 200 and the module 300 can form a system. As an example, the module 300 can transmit power and data through operative coupling of the module interface 328 and the device interface 228, which may be pogo pin in type. As an example, the module 300 can include one or more of a processor, a graphics card and a battery. Such a module may be a high performance module that can boost performance of the device 200 (e.g., computing performance).

As an example, a device can include a processor; memory accessible by the processor; a first housing that includes a display operatively coupled to the processor; a second housing that includes a keyboard on a keyboard side, a first interface on an opposing exterior side that couples to an expansion module and a second interface on an exterior hinge assembly side that couples to a docking station; and a hinge assembly that operatively couples the first housing to the second housing.

As a system, the device 200 and the module 300 can be a selectable performance system. For example, a user may utilize the device 200 as being configured at one performance level and may utilize the device 200 operatively coupled to the module 300 at another, higher performance level; albeit at greater volume (e.g., size) and mass (e.g., weight).

In the foregoing example, the system can be "high end" and capable of performing tasks of a workstation (e.g., graphics, CAD, video editing, gaming, etc.). A user may decide what tasks are to be performed and then decide whether to couple the module 300 to the device 200 or not. As an example, where a user does not need the "high end" performance, the user may utilize the device 200 without the module 300 being operatively coupled thereto. Or, as an example, where a highest level of transportability is desired (e.g., primary while computing power is secondary), the user may utilize the device 200 without the module 300 being operatively coupled thereto; noting that, the device 200 and the module 300 can be transportable, as coupled or as separate units. As an example, a traveler may carry-on the device 200 and pack the module 300 in a check-in bag. Once at a destination, the traveler may desire to utilize one or more features of the modules 300 and operatively couple it to the device 200.

As an example, the module 300 can be operative without being physically attached to the device 200. For example, the module 300 can include a battery and charger circuitry that can allow for charging of the battery without the module 300 being physically attached to the device 200. As an example, where the module 300 includes a battery, charger circuitry of the device 200 may be operatively coupled to the battery to charge it (e.g., when the device 200 is connected to an outlet, whether a wall outlet, a vehicle outlet, etc.).

As an example, the module 300 may include wireless circuitry such that it can communicate with circuitry of the device 200 without being physically attached to the device 200. For example, the module 300 may include a SIM card with cellular communication circuitry such that the module 300 can operate as a "hot spot" for wireless network access. In such an example, the device 200 may utilize the module 300 as a hot spot to access the Internet. In such an example, the module 300 may be a network module that includes router circuitry (e.g., a router, etc.). As an example, when a user is in a passenger in a vehicle, the user may utilize the device 200 as a laptop and utilize the module 300 as a mobile hot spot where the module 300 may be in a bag, in the back seat, in the trunk, etc. As an example, more than one device may utilize the module 300, if so configured, as a hot spot for connecting to the Internet.

As mentioned, the module interface 328 and the device interface 228 may be operatively coupled using pin and ball technology. For example, the device interface 228 may include balls and the module interface 328 may include pins that can contact the balls to form electrical connections. As an example, the module interface 328 and the device interface 228 may include optical transmission features (e.g., fiber optics, waveguide, etc.). As an example, one or more of the interfaces may include a sliding cover and/or a deployment mechanism. For example, where one of the interfaces 228 and 328 includes pins, the pins may be covered and/or retracted when not in use. As an example, where one of the interfaces 228 and 328 includes balls, the balls may be covered and/or retracted when not in use. As an example, the interfaces 228 and 328 may be operatively coupled using one or more magnetic components. For example, one or both of the interfaces 228 and 328 may move (e.g., translate, etc.) to make electrical and/or one or more other types of connections once they are in close enough proximity (e.g., within about 5 mm to about 10 mm). As an example, the interfaces 228 and 328 can be relatively clean in their appearance and durable if exposed. In such an example, appearance and/or durability may be achieved via one or more mechanisms (e.g., magnetics, covers, etc.).

Figure 3:
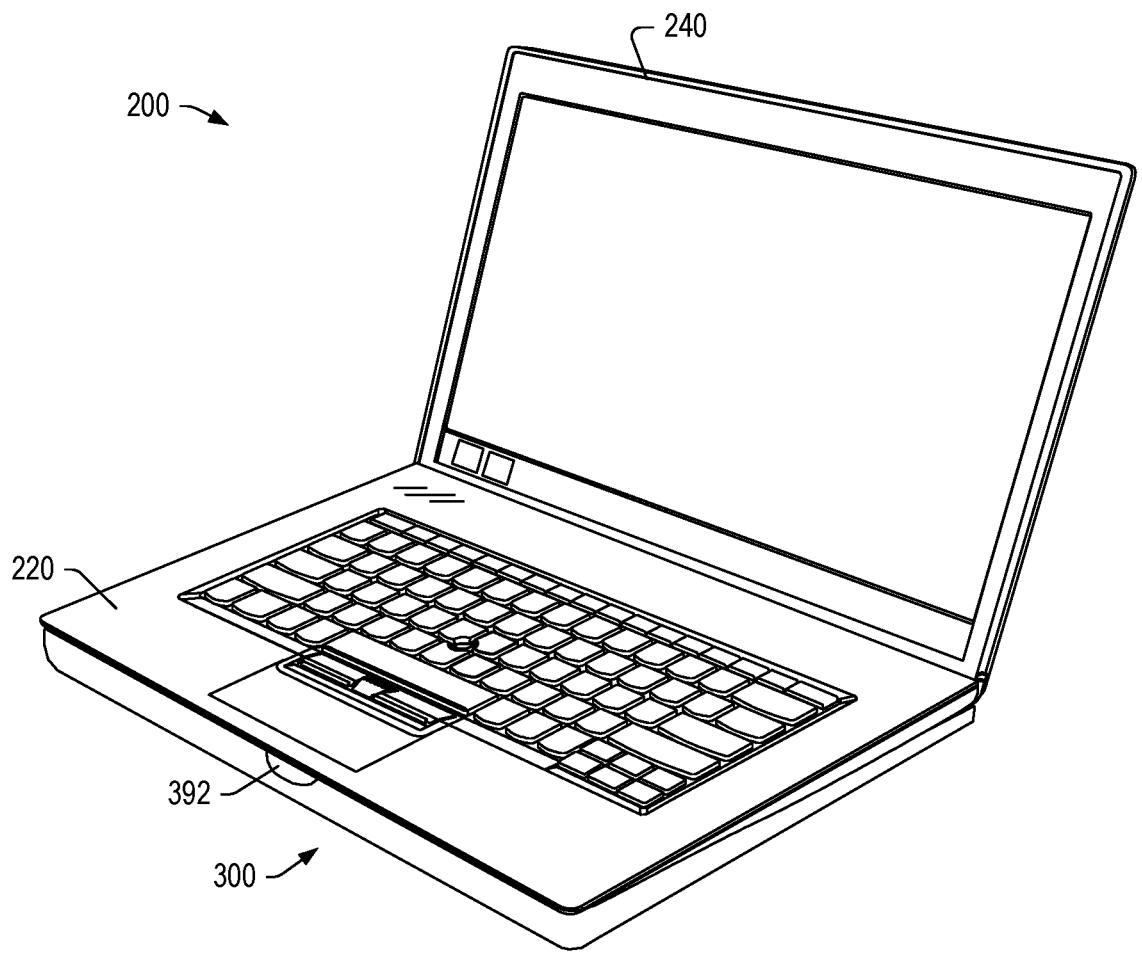
FIG. 3 is a diagram of an example of a system that includes the device and the module of FIG. 2.

FIG. 3 shows an example of the device 200 being operatively coupled to the module 300. In the example of FIG. 3, the device 200 is physically coupled to the module 300 such that, as a system, the thickness of the lower portion, which is composed of the keyboard housing 220 and the module 300, is thicker than that of the keyboard housing 220 alone. Such a system may be transitioned to a closed, clamshell orientation by, for example, folding down the display housing 240 such that the display 244 is substantially parallel to the keyboard 224. In such an orientation, the device 200 and the module 300, as physically coupled, may be transportable as a unit.

Figure 4:
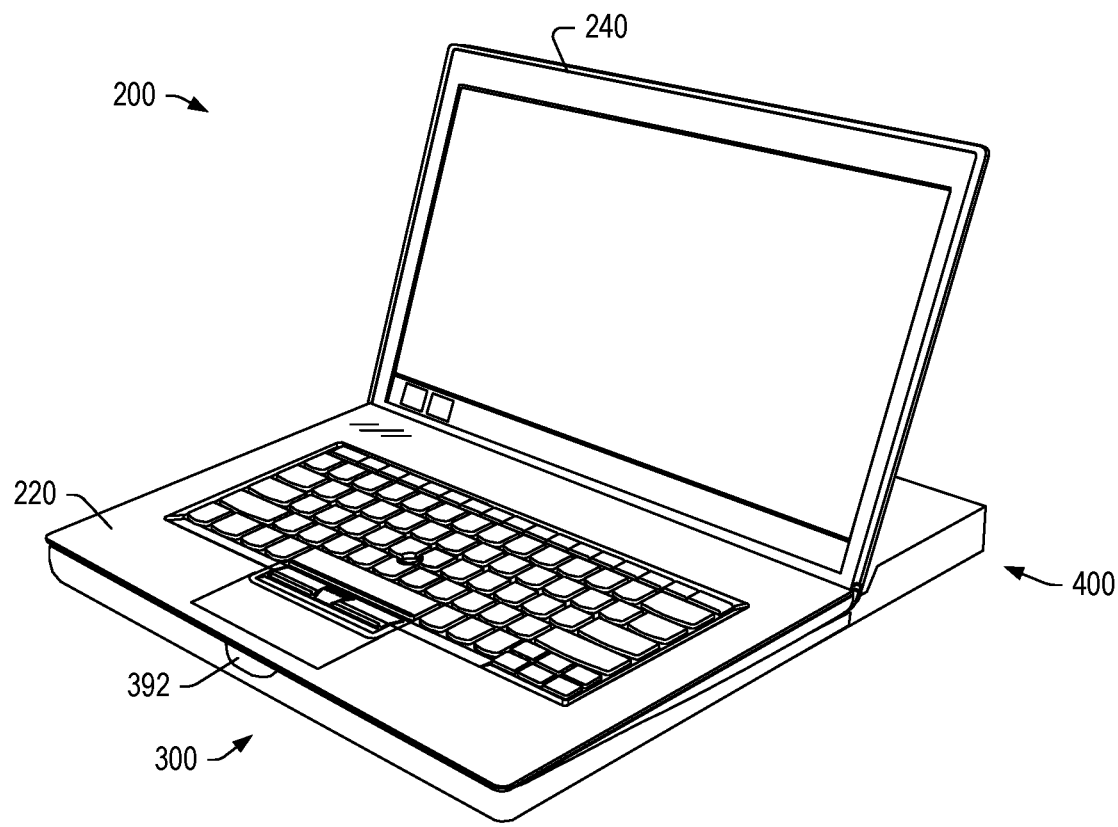
FIG. 4 is a diagram of an example of a system that includes the device and the module of FIG. 2 and that includes an example of a docking station.

FIG. 4 shows an example of the system of FIG. 3 as further including a docking station 400. In the example of FIG. 4, the docking station 400 may be operatively coupled to the device 200 and/or the module 300. As shown, the docking station 400 is physically coupled to the system formed by the device 200 and the module 300.

The docking station 400 can include circuitry and interfaces for various functions. For example, the docking station 400 can include a display interface (e.g., HDMI) for operatively coupling to a display or displays, which may be a desktop display or displays as may be found in an office setting. The docking station 400 can include one or more network interfaces (e.g., RJ-45, etc.) for coupling to a network cable as may be found in an office setting. The docking station 400 can include a power connector that can be coupled to a power cable that includes a plug that can be received by a wall power outlet.

In the example of FIG. 4, the docking station 400 can include one or more interfaces, which may be suitable for operative coupling to one or more of an interface of the device 200 and/or an interface of the module 300. As an example, the device 200 can include the device interface 228 and another device interface, for example, such as a device interface 227 as shown in an example of FIG. 7. As an example, the module 300 can include the module interface 328 and another module interface, for example, such as a module interface 327 as shown in an example of FIG. 8. As an example, the docking station 400 can include one or more docking station interfaces, for example, such as one or more docking station interfaces 427 as shown in an example of FIG. 7 and in an example of FIG. 8.

Figure 5:
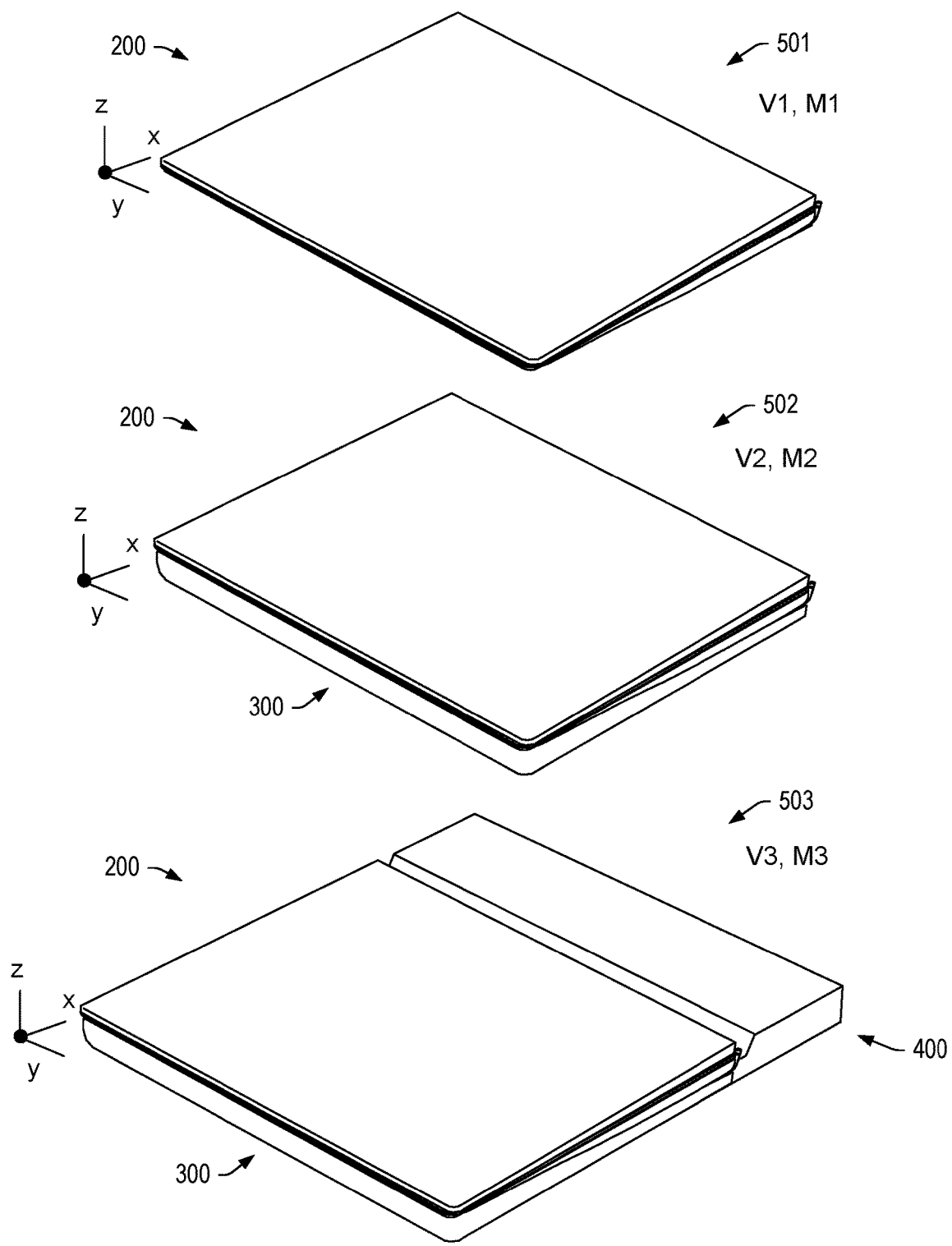
FIG. 5 is a series of views of the device, the module and the docking station of FIG. 4.

FIG. 5 shows three example configurations 501, 502 and 503 where the configuration 501 corresponds to the device 200 alone, where the configuration 502 corresponds to the device 200 physically coupled to the module 300, and where the configuration 503 corresponds to the device 200 and the module 300 physically coupled as a system that is further physically coupled to the docking station 400. As an example, another configuration (not shown) may include the device 200 physically coupled to the docking station 400.

In the examples of FIG. 5, parameters V1, V2, and V3 represent volumes (e.g., sizes) of the configurations 501, 502, and 503, respectively, and parameters M1, M2, and M3 represent masses (e.g., weights) of the configurations 501, 502, and 503, respectively. In the examples, V3>V2>V1 and M3>M2>M1.

As an example, the configuration 503 may be transportable. For example, the docking station 400 may firmly lock to the system formed by the device 200 and the module 300 such that the device, the module 300 and the docking station 400 can be carried as a system. In the example of FIG. 5, the configuration 503 may be dimensioned such that the thickness of the docking station 400 may be approximately the back end thickness of the system formed by the device 200 stacked onto the module 300.

The device 200 and the module 300 may be provided as a system and/or the device 200, the module 300 and the docking station 400 may be provided as a system. As an example, the device 200 and the docking station 400 may be provided as a system. In such examples, the systems are configurable (see, e.g., the configurations 501, 502, and 503 of FIG. 5, etc.).

For one user experience mode (e.g., the configuration 501), the device 200 can be a laptop that is smaller, thinner and lighter. In such an example, it can provide a user with an ultra-light capability where she does not need, for example, heavy-duty processing power and high end graphics. Such a user may take the device 200 to meetings, for travel and home when using applications that do not necessarily benefit substantially from additional processing power (e.g., consider word processing applications, email applications, etc.).

In another user experience mode, the device 200 as an ultra-light laptop can stack with the module 300, which may have a substantially similar footprint and which may provide access to higher performance (e.g., via memory, one or more processors, etc.). As mentioned, the module 300 may provide more CPU power, higher graphics and a larger battery. In such a mode, a user may use the device 200 and the module 300 in the stacked orientation at the office, optionally taking both for travel or back and forth from home. Such a system provides a user with choices, for example, travel with light performance (e.g., less weight and size) or high performance when needed (e.g., an ability to form a system stack).

In yet another user experience mode, the device 200 as a laptop that may be stacked with the module 300 can connect to the docking station 400, which may be resident at a user's workspace desk (e.g., an office desk). In such a mode, when leaving the workspace desk, the user may either take just the device 200 or the device 200 and the module 300. In either instance, the user may be able to rapidly disconnect either or both from the docking station 400, optionally without having to disconnect cables, etc. Similarly, upon return to the workspace desk, the user may readily connect either or both to the docking station 400, again, optionally without having to disconnect cables, etc. (e.g., where such workspace desk cables are already coupled to the docking station 400).

As mentioned, in another user experience mode, the device 200 may be physically coupled to the docking station 400 without the module 300 being physically coupled to the device 200. Such a docking station may be operatively coupled to one or more components (e.g., external monitor, HDD, printer, etc.).

As explained, the device 200 can include a plurality of device interfaces 227 and 228, where one can be suitable for connection to a module interface 328 of the module 300 and where another can be suitable for connection to a docking station interface 427 of the docking station 400. Such a device can be part of a system that includes various configurations, which can be selected by a user to meet a user's desires, which may balance transportability and processing and/or other resources.

FIG. 6 shows an example of the device 200 and an example of the module 300 along with vents 270, 280, 370, 380 and the feet 229 and the feet 329. In the examples of FIG. 6, the module 300 can include one or more vents 370 and 380 that can accommodate one or more corresponding vents 270 and 280 of the device 200. As shown, the vents 270 are air flow vents associated with cooling while the vents 280 are sound vents associated with audio speakers. The module 300 can include one or more vents as pass through vents to assure that, when a system is formed by physically coupling the module 300 to the device 200, air flow for cooling and/or sound are not impeded.

FIG. 6 also shows an example of features that may be included in the device 200, such as, for example, a fan 271 and speakers 281, which can be aligned with one or more of the one or more vents 270 and 280 and, in a coupled state or stacked state, aligned with one or more of the vents 370 and 380. As shown, the interface 228 is operatively coupled to circuitry of the device 200 such that one or more electrical connections may be made when the device 200 is stacked onto the module 300.

As mentioned, the module 300 can include the recesses 393 that can accommodate the feet 229 (e.g., pads) of the device 200. As shown, the module 300 can include the feet 329 (e.g., pads), which may space a bottom surface of the module 300 a sufficient distance from a flat surface to allow for passage of air (e.g., as to cooling air, sound waves, etc.).

As an example, the module 300 can include one or more fans (e.g., air movers) and/or one or more audio speakers. As an example, the module 300 can include one or more passages and/or chambers that can alter sound. For example, consider a passage and/or a chamber that can boost low frequency sound.

As an example, the module 300 can include a bass reflex system (also known as a ported, vented box or reflex port) as a type of enclosure that uses a port (hole) or vent cut into a housing of the module 300 and a section of tubing or pipe affixed to the port. In such an example, the port can enable sound from a side of a diaphragm (e.g., a rear side) to increase efficiency at low frequencies as compared to a typical closed box (sealed-box) or an infinite baffle mounting.

As an example, the module 300 can include one or more passive radiators to increase low frequency sound. Such a module can include a port as a mechanism for an extended bass response and/or a passive radiator. A passive radiator can include use of one or more additional speakers in a housing (e.g., a cabinet). In such an example, a speaker may include a magnet and voice coil and a passive radiator speaker may include cone without a magnet or voice coil (e.g., or with the voice coil disabled). As an example, a passive radiator can be referred to as a drone cones. As an example, the module 300 can include one or more speakers, one or more passive radiators and/or one or more bass reflex systems.

As mentioned, the module 300 can include performance features that can boost performance of a game application (e.g., gaming). As sound can be part of a game experience, the module 300 may further include one or more audio speakers and/or one or more passages and/or chambers and/or one or more passive radiators that can increase efficiency of low frequency sound. Thus, in such an example, the module 300 can be a gaming module that increases performance of the device 200 and that increases sound production of the device 200. In such an example, the sound related features of the module 300 can be passive and/or active. For example, passive can be achieved via one or more passages and/or chambers and/or one or more passive radiators while active can be achieved via one or more audio circuits and/or audio speakers.

As an example, the module 300 can include one or more rotatable features. For example, consider a rotatable audio speaker and/or a rotatable port that may be able to create a Leslie type of speaker and/or sound (e.g., Doppler effect sound).

FIG. 6 also shows an example of the interfaces 228 and 328 where one or more magnets may optionally be employed. For example, the interface 228 can be recessed and be held in a recessed position via one or more biasing elements 296 (e.g., springs). When the interface 228 is in proximity to the interface 328, magnetic force due to one or more magnets (e.g., one or more components being magnetics or otherwise magnetized), may overcome the force of the one or more biasing elements 296 to thereby cause the interface 228 to move toward the interface 328. As shown, the interface 328 can include contacts 395, which may optionally be biased contacts (e.g., pogo pin type of contacts, etc.), and the interface 228 can include contacts 295, which may be substantially hemispherical or of another shape that is suitable for forming direct electrical contact with the contacts 395. In such an example, a user may maneuver the device 200 over the module 300 such that when stacked, proximity of magnetic materials results in a magnetic attraction force that overcomes a biasing force that otherwise acts to keep the interface 228 of the device 200 in a recessed state. The magnetic attraction force can bring the interfaces 228 and 328 closer together to allow for formation of electrical contacts. When a user desires to detach the device 200 from the module 300, the user may apply force that is sufficient to overcome the magnetic attraction force, which may be aided by the one or more biasing element 296 to cause operative decoupling of the interfaces 228 and 328 and for the interface 228 to return to its recessed state. While the example illustrated shows contacts 295 and 395 as being of a certain type, they may be of one or more other types and, for example, the mechanism(s) may be reversed (e.g., the interface 228 may include the contacts 395 and the interface 328 may include the contacts 295).

Figure 7:
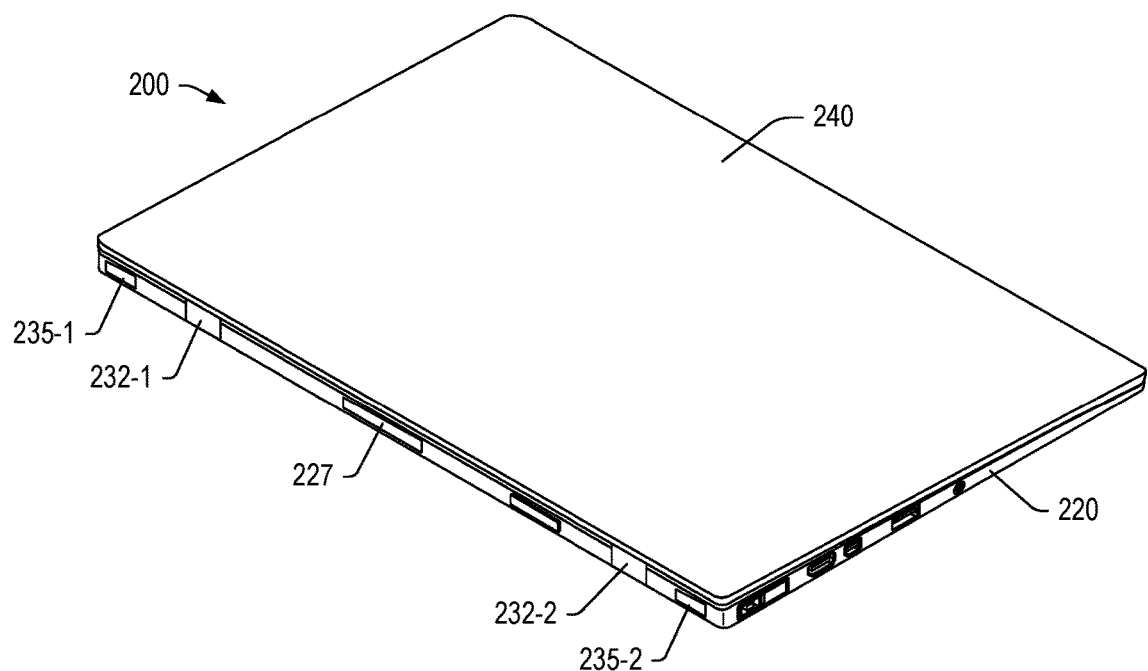
FIG. 7 is a series of diagrams of the device, the docking station and an example of a node and pin assembly.
Figure 7:
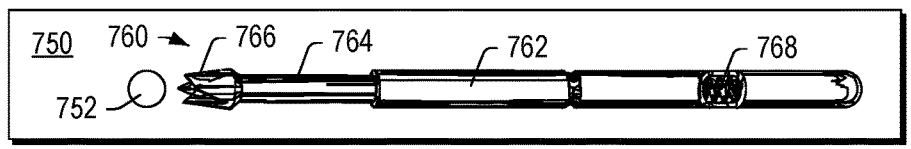
Figure 7:
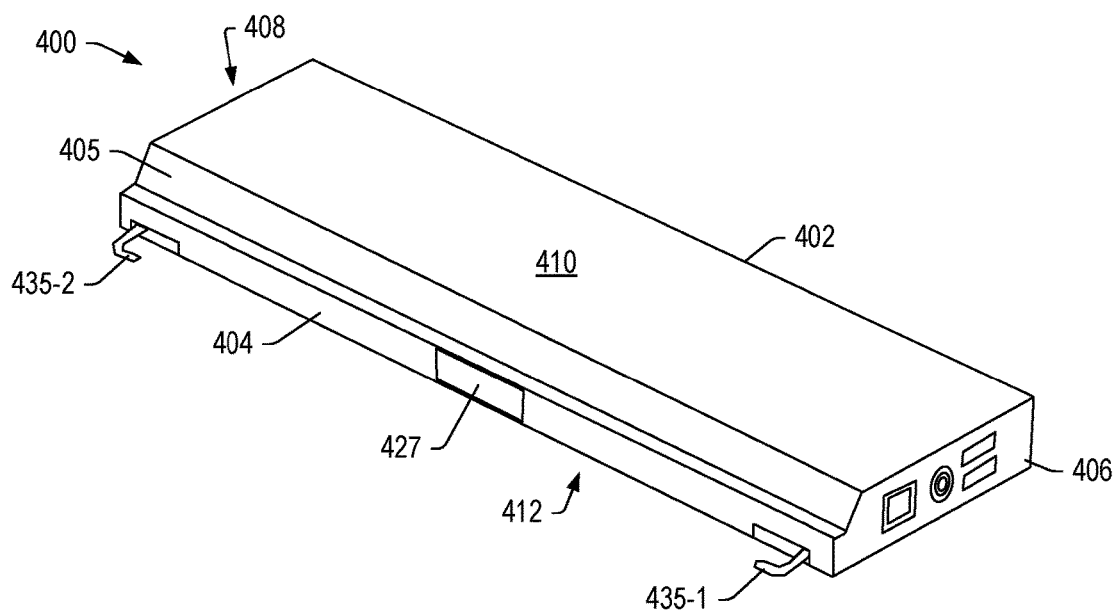

FIG. 7 shows an example of the device 200 and an example of the docking station 400 along with an example of a pin and node assembly 750 (e.g., or pin and ball assembly). In FIG. 7, the docking station 400 is shown as including a back end 402, a front end 404, a right side 406, a left side 408, a top side 410 and a bottom side 412. The front end 404 may abut the back end of the keyboard housing 220 (e.g., the hinge assembly side 202) and/or the back end 302 of the module 300, optionally where the keyboard housing 220 is stacked on top of the module 300. As an example, the right and left sides 406 and 408 of the docking station 400 may align with the right and left sides 206 and 208 of the keyboard housing 220 and/or the right and left sides 306 and 308 of the module 300.

As an example, the docking station 400 may have a height (z-direction) that is approximately the same as the back end height of a system formed by stacking the device 200 onto the module 300. In such an example, a system can be formed with a footprint that is about at least 5 percent larger than that of the device 200 and module 300, as stacked. As shown, the docking station 400 can include a recess 405 that can accommodate the display housing 240 of the device 200 when the display housing 240 is pivoted to an open orientation with respect to the keyboard housing 220. As shown in the example of FIG. 7, the docking station 400 can include one or more connection and/or other features on one or more of its sides (see, e.g., the right side 406).

As shown in the example of FIG. 7, the device 200 can include various connectors and/or features such as, for example, an audio connector, a USB connector, a video connector (e.g., mini DISPLAYPORT, HDMI, etc.), a ONELINK connector, a power connector, a SIM card tray, one or more status indicators, etc. As an example, a module and/or a docking station may include one or more of such connectors and/or features and/or one or more other types of connectors and/or features.

As an example, the interface 227 and/or the interface 228 of the device 200 can include one or more features of a ONELINK connector. A ONELINK connector can be utilized to deliver data, driver-free video, and power through a single connector. As an example, video may be delivered as uncompressed video.

As shown in FIG. 7, the device 200 can include one or more sockets 235-1 and 235-2 (e.g., keepers) and the docking station 400 can include one or more latches 435-1 and 435-2, or vice-versa. In a physically coupled state, the one or more latches 435-1 and 435-2 can be received by the one or more sockets 235-1 and 235-2 such that the interfaces 227 and 427 are connected. In the examples of FIG. 7, the one or more sockets 235-1 and 235-2 and the one or more latches 435-1 and 435-2 may be referred to as connectors.

As an example, a connector can include one or more components made of a non-ferromagnetic material and/or one or more components made of a ferromagnetic material. As an example, a connector can include one or more components made of a paramagnetic material. As an example, connector can include one or more components made of electrically conductive material that is non-ferromagnetic. As an example, one or more components of a connector or connectors can be made of a material that includes one or more of aluminum, magnesium, tungsten and titanium.

In the example of FIG. 7, the sockets 235-1 and 235-2 and the latches 435-1 and 435-2 may optionally include magnets and/or magnets and magnetic material that itself may not be magnetic but attracted to a magnet (e.g., consider a material that includes iron). As an example, a coupling mechanism can be a ferromagnetic coupling mechanism (e.g., ferromagnetism as a mechanism by which certain materials (such as iron) form permanent magnets, or are attracted to magnets). As an example, the device 200 may include ferromagnetic features rather than the sockets 235-1 and 235-2 and the docking station 400 may include ferromagnetic features rather than the latches 435-1 and 435-2 where the device 200 and the docking station 400 can physically couple via such features.

As shown in FIG. 7, the pin and node assembly 750 can include a node 750 and a pin connector 760 can include a slender hollow cylinder 762 that includes a movable shaft 764 (e.g., a pin) with a contact end 766 where one or more springs 768 apply a force to the shaft 764. In the example of FIG. 7, the contact end 766 includes a shape that can contact another contact piece such as the node 750 (e.g., a spherical surface or other shaped surface that can form an electrical contact with a contact end). As an example, when the device 200 and the docking station 400 are physically coupled, interface components may make contact with two circuits and thereby connect them together. As an example, a connector may include an array that takes the form of a ring that includes hundreds or thousands of individual pogo pins (e.g., a pogo tower).

As an example, pins may be arranged in an array, for example, for connecting nodes of circuitry. As an example, a bed of nails approach may be utilized. As an example, a system can include an array of nodes (e.g., optionally balls) and an array of pin connectors where the pin connectors can contact corresponding nodes to electrically connect circuits. As an example, magnetic force can be utilized to apply a pressing force between nodes and pin connectors.

As an example, a device can include a processor; memory accessible by the processor; a display housing that includes a display operatively coupled to the processor; a keyboard housing that includes a keyboard on a keyboard side, a first interface on an opposing exterior side that couples to an expansion module and a second interface on an exterior hinge assembly side that couples to a docking station; and a hinge assembly that operatively couples the display housing to the keyboard housing. For example, the device 200 can include the one or more processors 212, the memory 214 accessible thereto, the display housing 240 that includes the display 244, the keyboard housing 220 that includes the keyboard 224 on the keyboard side 209, the first interface 228 on the opposing exterior side 210 (e.g., bottom side) that can couple to the module 300 (e.g., an expansion module), and the interface 227 on the hinge assembly side 202 that can couple to the docking station 400 as well as one or more hinge assemblies 232 that can operatively couple the display housing 240 to the keyboard housing 220.

Figure 8:
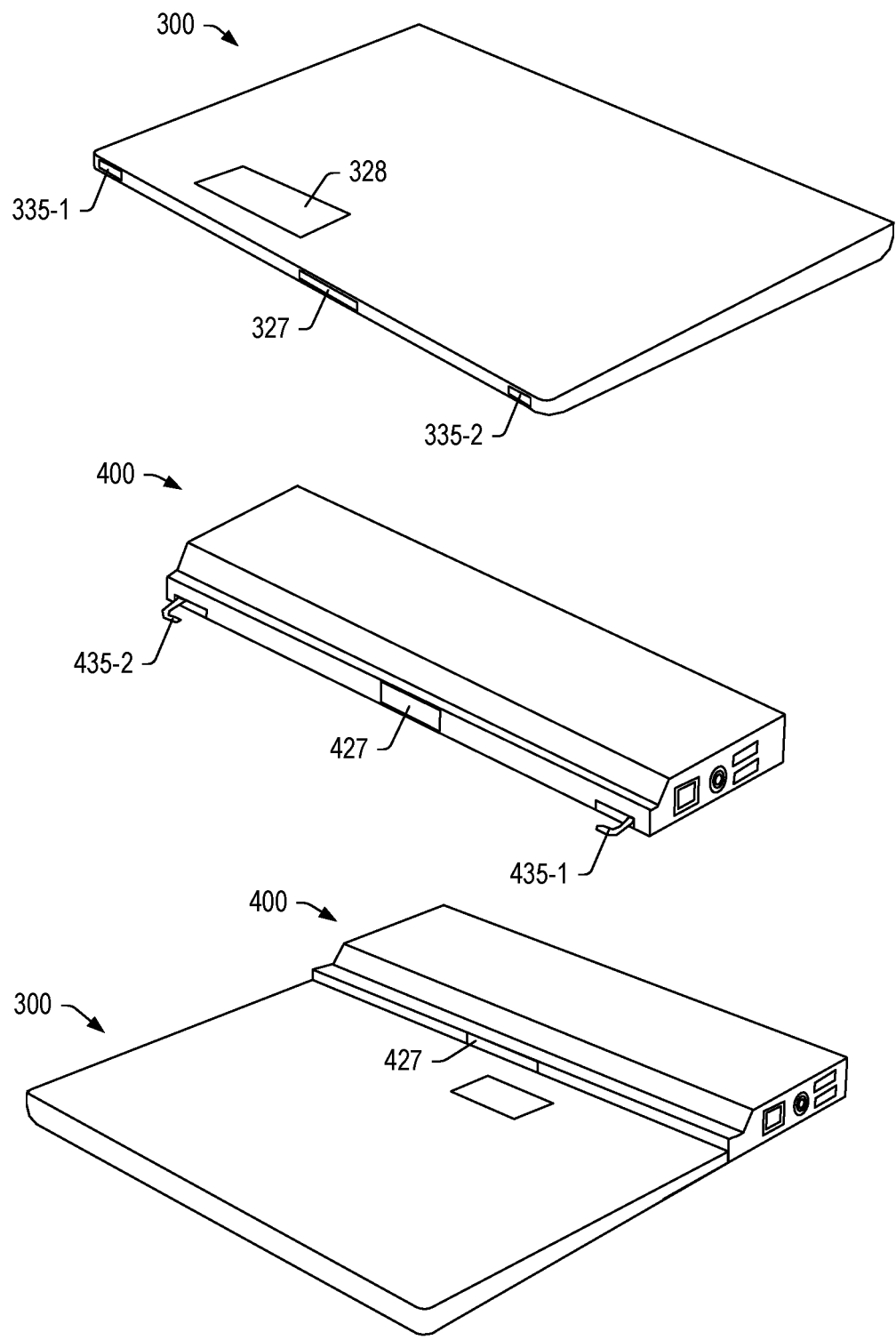
FIG. 8 is a series of diagrams of the module and the docking station.

FIG. 8 shows an example of the module 300 and an example of the docking station 400 in separate states and in an assembled state where the module 300 is operatively coupled to the docking station 400. For example, where the module 300 includes one or more rechargeable batteries, the module 300 may be operatively coupled to the docking station 400 where the docking station 400 may be electrically connected to a wall outlet for supply of power. In such an example, the docking station 400 may supply power to the module 300, for example, via the interfaces 327 and 427. As an example, in the assembled state, the module 300 and the docking station 400 may be further operatively coupled to the device 200 via stacking of the device 200 on the module 300, which may also include operatively coupling the device 200 to the interface 427 of the docking station 400. In such an example, the device 200 may be coupled via the interface 228 to the module 300 and be coupled via the interface 227 to the docking station 400. As an example, one or more circuit pathways may be established between the device 200 and the docking station 400 via the module 300 and/or between the docking station 400 and the module 300 via the device 200. Such pathways can depend on number, size, and type of interfaces. While FIG. 8 shows some examples of interfaces, one or more other interfaces may be included and optionally utilized (e.g., as part of the device 200, as part of the module 300 and/or as part of the docking station 400).

As shown in FIG. 8, the module 300 can include one or more sockets 335-1 and 335-2 (e.g., keepers) and the docking station 400 can include one or more latches 435-1 and 435-2, or vice-versa. In a physically coupled state, the one or more latches 435-1 and 435-2 can be received by the one or more sockets 335-1 and 335-2 such that the interfaces 327 and 427 are connected. In the examples of FIG. 8, the one or more sockets 335-1 and 335-2 and the one or more latches 435-1 and 435-2 may be referred to as connectors. Such connectors may be akin to those described with respect to the examples of FIG. 7 and/or the interfaces 327 and 427 may be akin to those described with respect to the examples of FIG. 7.

As shown in FIG. 8, the module 300 may couple to the docking station 400 such that the latches 435-1 and 435-2 are not available for coupling to the device 200. In such an example, the device 200 may couple to the module 300 and the docking station 400 in the assembled state of FIG. 8 via one or more other mechanisms. For example, the device 200, the module 300 and/or the docking station 400 can include one or more magnets that generate magnetic force that can couple the device 200 to the module 300 and/or the docking station 400 in the assembled state. As mentioned, one or more interfaces can include one or more magnetic materials that can provide for coupling and, for example, for alignment of one or more of the device 200, the module 300 and/or the docking station 400 with respect to at least one thereof.

As an example, the docking station 400 can include features arranged for physically coupling the docking station 400 to the device 200 or to the module 300. As an example, when the device 200 and the module 300 are stacked to form a system, the system may couple to the docking station 400 via the module 300 where the interface 427 of the docking station 400 operatively couples to the interface 327 of the module 300 and/or where the interface 427 of the docking station 400 operatively couples to the interface 227 of the device 200. As an example, the interface 427 may be dimensioned (e.g., in a z-direction) to make contact with the interface 227 and the interface 327 simultaneously. In such an example, one of the interfaces 227 and 327 may be disabled and the other enabled and/or both of the interfaces 227 and 327 may be enabled.

In the example of FIG. 8, the sockets 335-1 and 335-2 and the latches 435-1 and 435-2 may optionally include magnets and/or magnets and magnetic material that itself may not be magnetic but attracted to a magnet (e.g., consider a material that includes iron). As an example, a coupling mechanism can be a ferromagnetic coupling mechanism (e.g., ferromagnetism as a mechanism by which certain materials (such as iron) form permanent magnets, or are attracted to magnets). As an example, the module 300 may include ferromagnetic features rather than the sockets 335-1 and 335-2 and the docking station 400 may include ferromagnetic features rather than the latches 435-1 and 435-2 where the module 300 and the docking station 400 can physically couple via such features.

FIG. 9 shows an example of the module 300 as including one or more component bays 392, 394, 396, and 398. As an example, the module 300 may be a configurable module whereby a user may select one or more components for inclusion in the module 300. For example, where a user wants to boost graphics processing, the user may select the GPU circuitry 944 and insert it into an appropriate one of the one or more components bays 392, 394, 396, and 398 of the module 300.

As an example, the device 200 can be a light-weight computing device such as a "Chromebook", which may be running a Linux-based Chrome operating system (OS). Such an OS can be suitable for connecting to the Internet (e.g., where applications and data utilize remote, cloud-based equipment). In such an example, the device 200 may be a "thin client". Where a user of such a device desires further options, the module 300 may be configured with a different operation system such as, for example, a WINDOW® OS. In such an example, the module 300 can include the operating system circuitry component 947.

As mentioned, the module 300 may optionally be configured to be a network device such as a hot spot. In such an example, the module 300 can include the network circuitry component 948. As an example, the module 300 may be configured as a router, optionally with Virtual Private Network capabilities (e.g., for secure communications).

A device can include a processor; memory accessible by the processor; a display housing that includes a display operatively coupled to the processor; a keyboard housing that includes a keyboard on a keyboard side, a first interface on an opposing exterior side that couples to an expansion module and a second interface on an exterior hinge assembly side that couples to a docking station; and a hinge assembly that operatively couples the display housing to the keyboard housing.

As an example, a first interface of a device that includes multiple interfaces can couple to an interface of an expansion module via one or more magnets. As an example, a second interface of a device can couple to an interface of a docking station via one or more magnets. In such examples, one or more of the interfaces can include at least one of translatable pins and nodes. For example, a pogo-pin interface can include one or more translatable pins and/or one or more nodes. Where an interface of a device includes at least one of pins and nodes, such one or more features can be electrically coupled to circuitry of the device. Where an interface of a module includes at least one of pins and nodes, such one or more features can be electrically coupled to circuitry of the module. Where an interface of a docking station includes at least one of pins and nodes, such one or more features can be electrically coupled to circuitry of the docking station. Where one interface of one unit is electrically coupled to another interface of another unit via direct physical contact, circuitry of the two units can be electrically coupled (e.g., device to module, device to docking station, module to docking station, etc.).

As an example, a device can include a processor; memory accessible by the processor; a display housing that includes a display operatively coupled to the processor; a keyboard housing that includes a keyboard on a keyboard side, a first interface on an opposing exterior side that couples to an expansion module and a second interface on an exterior hinge assembly side that couples to a docking station; and a hinge assembly that operatively couples the display housing to the keyboard housing where the device has an uncoupled state associated with a first operating system stored in the memory and executable by the processor and a coupled state where the device is coupled to the expansion module. In such an example, in the coupled state, at least a portion of circuitry of the device can operate under control of a second, different operating system of the expansion module, for example, based at least in part on information received via the first interface. For example, in the coupled state, at least a portion of circuitry of the device can operate based at least in part on information received via the first interface where the received information is generated by a second, different operating system of the expansion module. In such an example, the module can include one or more processors and memory that stores operating system instructions for the second, different operating system that are executable by at least one of the one or more processors to establish an operating system environment of the second, different operating system.

As an example, circuitry of the expansion module can establish an operating system environment of the second, different operating system where information may be transmitted via the first interface to and/or from the device. In such an example, the device, in the uncoupled state, may be a lightweight device (e.g., a Chromebook device); whereas, in the coupled state, a system can be formed with a more extensive operating system (e.g., a WINDOWS® operating system such as one being as extensive as one of WINDOWS® 7, 8, and 10) where, for example, the keyboard of the device and the display of the device can be utilized to interact with the more extensive operating system. In such an example, the expansion module may optionally include applications stored in memory of the expansion module where such applications can be executed in the established more extensive operating system environment and controlled at least in part via information received via the first interface where, for example, information generated by the one or more applications can be transmitted to the device for one or more purposes (e.g., rendering at least a portion of such information to the display of the display housing, etc.).

As an example, a device that includes multiple interfaces can include a first interface that is a power and information interface. Such an interface can be an expansion module interface that is located on a bottom side of a keyboard housing where the device can receive power and information from the expansion module.

As an example, a device can include a first interface and circuitry that receives video information via the first interface and that renders the video information to a display of the device.

As an example, an interface of a device can be a graphics processing unit interface that operatively coupes to a graphics processing unit of an expansion module. For example, a device can include a keyboard housing with a bottom side as an exterior side that includes such an interface. As an example, the expansion module can be of a common footprint with the keyboard housing and attached thereto for purposes of transporting the device and the expansion module as a system. As an example, attachment may be via one or more types of mechanisms such as, for example, latches, keepers, magnets, magnetic materials, etc.

As an example, a device can include a keyboard housing that includes one or more vents that are located on a bottom side of the keyboard housing, where the bottom side opposes a keyboard side. In such an example, the keyboard housing can include feet such that when resting on a flat surface, a gap exists between the vent openings and the flat surface for flow of air. As an example, an expansion module can include one or more vents (e.g., passages, openings, etc.) that can accommodate the one or more vents of a keyboard housing. In such an example, the expansion module can allow for flow of air, whether cooling air or acoustic waves. As an example, a keyboard housing of a device can include a speaker and at least one vent that is in fluid communication with the speaker. In such an example, the at least one vent may be referred to as a speaker vent.

As an example, an expansion module can include one or more sound related features, which, for example, may enhance sound of a device. As an example, a sound related feature may be active and/or passive.

As an example, an assembly can include an information handling device that includes a processor, memory accessible by the processor, a display housing that includes a display operatively coupled to the processor, a keyboard housing that includes a bottom side, an opposing keyboard side, and an electrical interface, and a hinge assembly that operatively couples the display housing to the keyboard housing; and a module that includes circuitry where the keyboard housing stacks onto the module to, in a stacked state, operatively couple the circuitry of the module to the electrical interface of the keyboard housing. In such an example, the electrical interface can include at least one of translatable pins and nodes. Such an electrical interface can be on the bottom side of the keyboard housing and, in the stacked state, the bottom side of the keyboard housing can be adjacent to a top side of the module; noting that, in the stacked state, the device and the module are in physical contact. As an example, coupling features can maintain such physical contact, which can be sufficient for transport of the device and the module as a physically coupled assembly (e.g., as a mobile assembly). As mentioned, coupling features may include one or more of magnetic materials, latches, sockets, etc. Coupling features provide for coupling and allow for decoupling, for example, via force applied by a hand or hands to separate a device from a module, a device from a docking station, a module from a docking station, a device from a module and a docking station, etc.

As an example, the aforementioned information handling device and module assembly can include a docking station that may include a module interface that operatively couples to the circuitry of the module. For example, the module can include a docking station interface where, in a coupled state, the docking station interface and the module interface provide for electrical connection of circuitry of the docking station and circuitry of the module.

As an example, a keyboard housing and a module can include at least one magnet that, in a stacked state, secures the module to the keyboard housing and that aligns a perimeter of the module and a perimeter of the keyboard housing.

As an example, an information handling device can be fan-less and a module can include a fan. In such an example, the fan of the module may be utilized to move air that can cool the module and the information handling device. For example, the fan of the module may be in fluid communication with one or more openings of the information handling device such that air is drawn out of and/or forced into the information handling device. Where the information handling device is fan-less, it may utilize less energy and may optionally include a smaller capacity rechargeable battery that has a corresponding smaller size and mass. Where the information handling device is a netbook device (e.g., a Chromebook, etc.), it may be designed for lesser weight and greater transportability; while being able to transform into a more powerful computing device when coupled to a module (e.g., an expansion module), which, as having more computing power, can be of greater heat generation and include one or more fans for purposes of cooling.

As an example, a bottom side of a keyboard housing (e.g., a side opposite a keyboard side of the keyboard housing) can include a housing vent and a module can include a module vent that, in stacked state of the keyboard housing and the module, aligns with the housing vent.

As an example, a module can include at least one battery that, in a stacked state with a keyboard housing of a device, is operatively coupled to a display of a display housing that is coupled to the keyboard housing via a hinge assembly where power of the at least one battery can power circuitry of the display.

As an example, a module can include a module processor where a number of cores of the module processor is at least equal to a number of cores of a processor of an information handling device.

As an example, a module can include a circuitry plug-in bay and a circuitry plug-in disposed in the circuitry plug-in bay where the circuitry plug-in is selected from a plurality of different types of circuitry plug-ins disposable in the circuitry plug-in bay. In such an example, the plurality of different types of circuitry plug-ins can include at least one memory plug-in. As an example, a plurality of different types of circuitry plug-ins can include at least one graphics processing plug-in that, in a stacked state of the module with respect to a keyboard housing of a device (e.g., a laptop), the at least one plug-in can processes graphics renderable to a display of a display housing of the device. Where the device is operatively coupled to a docking station, the docking station may be operatively coupled to a display via a cable such as an HDMI cable. In such an example, the graphics may be renderable to the display.

As an example, a module can include at least one sound enhancement feature that can enhance sound generated by audio circuitry of an information handling device. For example, the module may include one or more passive and/or active features that can receive acoustic energy from a speaker of the information handling device. In such an example, the receipt of such energy may be via an opening, which can be a vent. For example, the information handling device can include a speaker vent and the module can include an opening that aligns with the speaker vent to receive acoustic energy emanating from the speaker vent. In such an example, the module can include one or more passages, chambers, domes, etc. that can enhance sound (e.g., bass reflex, passive radiator, etc.).

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
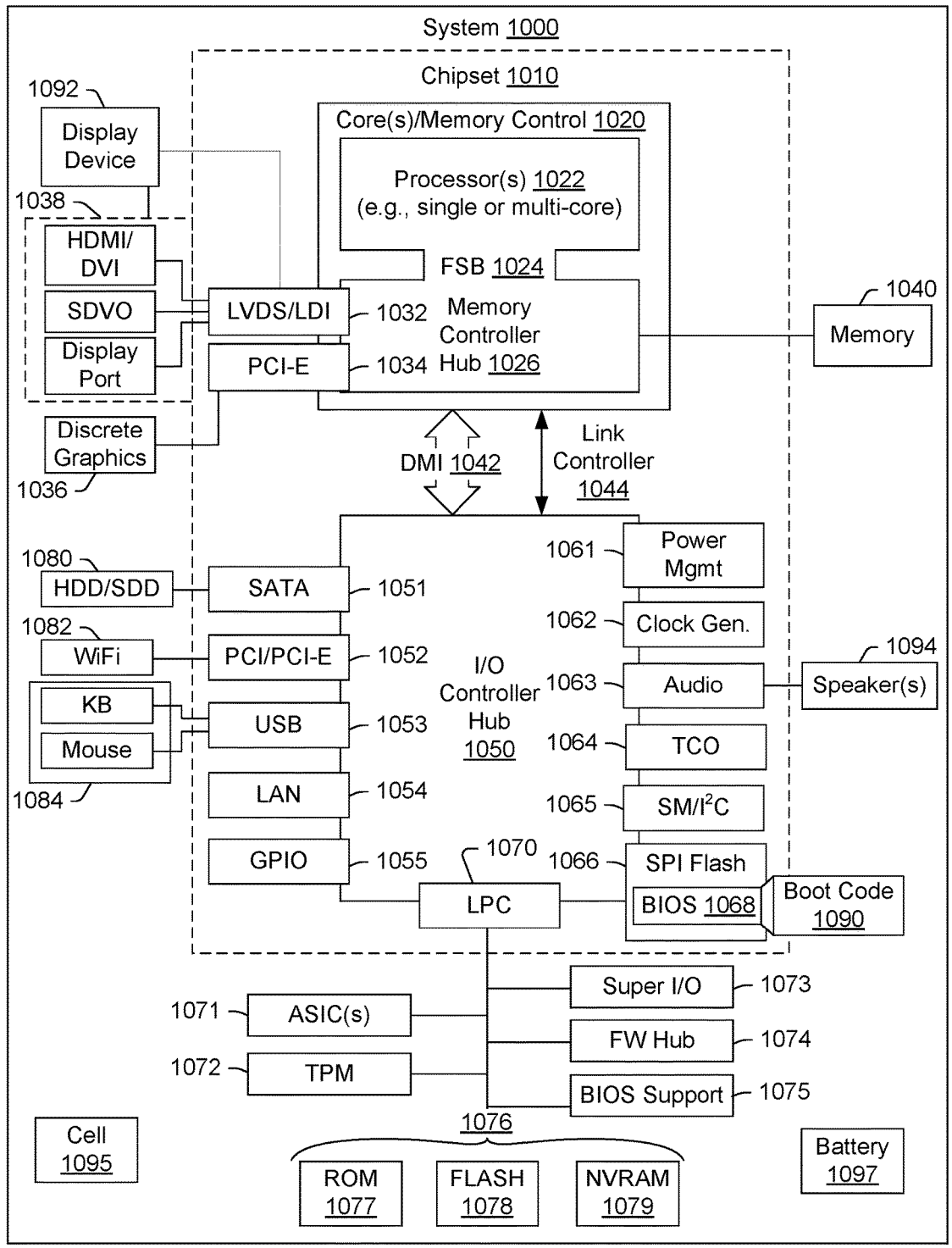
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising: a processor; memory accessible by the processor; a display housing that comprises a display operatively coupled to the processor; a keyboard housing that comprises a keyboard on a keyboard side, a first interface on an opposing exterior side that couples to an expansion module and a second interface on an exterior hinge assembly side, the second interface configured to couple to a docking station, wherein the first interface couples to an interface of the expansion module via one or more magnets, wherein the exterior side of the keyboard housing comprises at least one vent, and wherein the exterior side of the keyboard housing comprises feet, wherein the feet space the expansion module a distance from the exterior side of the keyboard housing, wherein the distance actuates the one or more magnets to couple the first interface to the interface of the expansion module, and wherein the distance reduces heat conduction and provides space for air flow for the at least one vent; and a hinge assembly that operatively couples the display housing to the keyboard housing.

2. The device of claim 1, comprising the docking station, wherein the second interface couples to an interface of the docking station via one or more magnets.

3. The device of claim 1 wherein the first interface comprises at least one of translatable pins electrically coupled to circuitry of the device and nodes electrically coupled to circuitry of the device.

4. The device of claim 1 wherein the second interface comprises at least one of translatable pins electrically coupled to circuitry of the device and nodes electrically coupled to circuitry of the device.

5. The device of claim 1 comprising an uncoupled state associated with a first operating system stored in the memory and executable by the processor and comprising a coupled state, wherein, in the coupled state, at least a portion of circuitry of the device operates based at least in part on information received via the first interface wherein the received information is generated by a second, different operating system of the expansion module.

6. The device of claim 1 wherein the first interface comprises a power and information interface.

7. The device of claim 1 wherein the first interface comprises a graphics processing unit interface that operatively coupes to a graphics processing unit of the expansion module.

8. The device of claim 1 wherein the device comprises a speaker and wherein at least one of the at least one vent is in fluid communication with the speaker.

9. An assembly comprising: an expansion module; and a device that comprises a processor, memory accessible by the processor, a display housing that comprises a display operatively coupled to the processor, a keyboard housing that comprises a keyboard on a keyboard side, a first interface on an opposing exterior side that couples to the expansion module and a second interface on an exterior hinge assembly side, the second interface configured to couple to a docking station, wherein the first interface couples to an interface of the expansion module via one or more magnets, wherein the exterior side of the keyboard housing comprises at least one vent, and wherein the exterior side of the keyboard housing comprises feet, wherein the feet space the expansion module a distance from the exterior side of the keyboard housing, wherein the distance actuates the one or more magnets to couple the first interface to the interface of the expansion module, and wherein the distance reduces heat conduction and provides space for air flow for the at least one vent, and a hinge assembly that operatively couples the display housing to the keyboard housing.

10. The assembly of claim 9 wherein the expansion module comprises an expansion module processor wherein a number of cores of the expansion module processor is at least equal to a number of cores of the processor of the device.

11. The assembly of claim 9 wherein the expansion module comprises a circuitry plug-in bay and comprising a circuitry plug-in disposed in the circuitry plug-in bay wherein the circuitry plug-in is selected from a plurality of different types of circuitry plug-ins disposable in the circuitry plug-in bay.

12. The assembly of claim 11 wherein the plurality of different types of circuitry plug-ins comprises at least one graphics processing plug-in that, in the stacked state, processes graphics renderable to the display.

13. The assembly of claim 9 wherein the expansion module comprises recesses that receive the feet.

14. The assembly of claim 9 wherein the expansion module comprises at least one of the one or more magnets.

15. The assembly of claim 14 wherein the keyboard housing comprises magnet material, wherein the at least one of the one or more magnets of the expansion module is attracted to the magnetic material.

16. The assembly of claim 9 wherein the keyboard housing comprises at least one of the one or more magnets.

17. The assembly of claim 16 wherein the expansion module comprises magnet material, wherein the at least one of the one or more magnets of the keyboard housing is attracted to the magnetic material.

* * * * *